United States Patent
Hayashida (10) Patent No.: US 10,252,172 B2
(45) Date of Patent: Apr. 9, 2019

(54) GAME SYSTEM WITH SHARED REPLAYS

(71) Applicant: NINTENDO CO., LTD., Kyoto (JP)

(72) Inventor: Koichi Hayashida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 626 days.

(21) Appl. No.: 14/524,275

(22) Filed: Oct. 27, 2014

(65) Prior Publication Data

US 2015/0224409 A1 Aug. 13, 2015

(30) Foreign Application Priority Data

Feb. 13, 2014 (JP) .................................. 2014-25818

(51) Int. Cl.
| | | |
|---|---|---|
| G07F 17/00 | (2006.01) | |
| G06F 19/00 | (2018.01) | |
| A63F 13/87 | (2014.01) | |
| A63F 13/497 | (2014.01) | |
| A63F 13/86 | (2014.01) | |
| A63F 13/795 | (2014.01) | |

(52) U.S. Cl.
CPC ............ *A63F 13/87* (2014.09); *A63F 13/497* (2014.09); *A63F 13/795* (2014.09); *A63F 13/86* (2014.09)

(58) Field of Classification Search
None
See application file for complete search history.

(56) References Cited

U.S. PATENT DOCUMENTS

| | | |
|---|---|---|
| 5,083,271 A | 1/1992 | Thacher |
| 5,970,143 A | 10/1999 | Schneier |
| 5,971,849 A | 10/1999 | Falciglia |
| 6,174,236 B1 | 1/2001 | Tsuda |
| 7,798,905 B2 | 9/2010 | Thompson |
| 8,038,535 B2 | 10/2011 | Jensen |
| 8,221,238 B1 | 7/2012 | Shaw |
| 8,425,331 B2 | 4/2013 | Bortnik |
| 8,668,590 B2 | 3/2014 | Barclay |
| 8,684,834 B2 | 4/2014 | Koyama |
| 8,696,468 B2 | 4/2014 | Layne, IV |
| 8,876,606 B2 | 11/2014 | Bortnik |

(Continued)

FOREIGN PATENT DOCUMENTS

| | | |
|---|---|---|
| JP | 2008-12221 | 1/2008 |
| JP | 2008-104707 | 5/2008 |

(Continued)

OTHER PUBLICATIONS

European Search Report (9 pages) dated Jul. 8, 2015, issued in corresponding European Application No. 14190236.1.

(Continued)

*Primary Examiner* — Lawrence S Galka (74) *Attorney, Agent, or Firm* — Nixon & Vanderhye P.C.

(57) ABSTRACT

An example information sharing system includes: an executing unit that executes an application program according to operations of one of a plurality of users; a recording unit that records replay data for replicating an execution process of the application program; a generating unit that generates shared information associated with the application program based on operations of the one of the plurality of users; and a sharing unit that shares the generated shared information and the recorded replay data with the plurality of users.

16 Claims, 7 Drawing Sheets

(56) References Cited

U.S. PATENT DOCUMENTS

| | | |
|---|---|---|
| 9,299,064 B1 | 3/2016 | Liu |
| 9,427,661 B1 | 8/2016 | Pascal |
| 2003/0087652 A1 | 5/2003 | Simon |
| 2003/0177347 A1 | 9/2003 | Schneier |
| 2004/0097287 A1 | 5/2004 | Postrel |
| 2004/0224741 A1* | 11/2004 | Jen ................... A63F 13/10 463/6 |
| 2007/0060359 A1* | 3/2007 | Smith ............. A63F 13/5258 463/42 |
| 2007/0117629 A1 | 5/2007 | Fowler |
| 2007/0173321 A1 | 7/2007 | Shen |
| 2007/0173327 A1 | 7/2007 | Kilgore |
| 2008/0113805 A1 | 5/2008 | David |
| 2008/0305832 A1 | 12/2008 | Greenberg |
| 2009/0082101 A1 | 3/2009 | Ostergren |
| 2009/0176557 A1 | 7/2009 | Hall |
| 2009/0227313 A1 | 9/2009 | Minka |
| 2009/0325690 A1* | 12/2009 | Zhou .................. A63F 13/12 463/29 |
| 2009/0327918 A1 | 12/2009 | Aaron |
| 2010/0069159 A1 | 3/2010 | Yamada et al. |
| 2010/0160038 A1* | 6/2010 | Youm ................. A63F 13/10 463/29 |
| 2010/0260487 A1* | 10/2010 | Zbeda ............... A63F 13/497 386/239 |
| 2011/0218034 A1 | 9/2011 | Barclay |
| 2011/0250969 A1 | 10/2011 | Os |
| 2011/0250971 A1 | 10/2011 | Van Os |
| 2012/0100910 A1 | 4/2012 | Eichorn et al. |
| 2012/0129610 A1 | 5/2012 | Mazursky |
| 2012/0214505 A1 | 8/2012 | Kaido |
| 2012/0225721 A1* | 9/2012 | Holder ............... A63F 13/67 463/42 |
| 2012/0225723 A1 | 9/2012 | Webster |
| 2012/0329557 A1 | 12/2012 | Takamura |
| 2013/0084969 A1* | 4/2013 | Knoles ............. A63F 13/795 463/29 |
| 2013/0184040 A1* | 7/2013 | Nonaka ............. A63F 13/12 463/7 |
| 2013/0190096 A1* | 7/2013 | Ronen ........... H04L 29/06034 463/43 |
| 2013/0260896 A1* | 10/2013 | Miura ................. A63F 13/12 463/42 |
| 2013/0344963 A1 | 12/2013 | Gupta |
| 2014/0156037 A1* | 6/2014 | Laakkonen ........ A63F 13/46 700/91 |
| 2014/0179424 A1* | 6/2014 | Perry ................. A63F 13/355 463/31 |
| 2014/0179427 A1* | 6/2014 | Miura ................. A63F 13/00 463/31 |
| 2014/0187318 A1* | 7/2014 | Gallizzi ............ A63F 13/355 463/31 |
| 2014/0256409 A1 | 9/2014 | Wood |
| 2014/0256447 A1* | 9/2014 | Woodman .......... A63F 13/497 463/42 |
| 2014/0364206 A1* | 12/2014 | Shiraiwa ........... A63F 13/355 463/31 |
| 2016/0112515 A1* | 4/2016 | Ohara ................ H04L 67/38 709/203 |
| 2017/0212771 A1 | 7/2017 | Weissberg |

FOREIGN PATENT DOCUMENTS

| | | |
|---|---|---|
| JP | 2010-239991 | 10/2010 |
| WO | 2005065796 | 7/2005 |

OTHER PUBLICATIONS

Author unknown, "Quake3 World—Demo System", URL:https//web.archive.org/web/20080129081429/http://www.quake3world.com/q3guide/demos.html, Jan. 29, 2008 (1 page).

Author unknown, "Quake3 demo format", URL:https//web.archive.org/web/20121028185331/http://www.tilion.org.uk/2011/11/quake-3-demo-format Jan. 2011, (81 pages).

Author unknown, "Manual of the video game 'Quake'", URL:http//quakeone.com/forums/quake-talk/quake-central/215-quake-1-pdf-manual.html p. 18, section "Multiplayer Action", Mar. 23, 2006, (23 pages).

Author unknown, "Playstation 4", URL:https//en.wikipedia.org/w/index.php?title=PlayStation_4&oldid=595200517#Social_features, section Social Features, Feb. 12, 2014 (19 pages).

Author unknown, "Super Stardust HD—Wikipedia Article". URL:https//en.wikipedia.org/w/index.php?title=Super_Stardust_HD&oldid=593966082, section "Gameplay", Feb. 4, 2014, (4 pages).

Nesvadba, "Trainyard Review", URL:http//appspy.com/review/4363/trainyard-review, Jun. 21, 2010 (3 pages).

[ONLINE] "Xbox LIVE Connects You" http://www.xbox.com/ja-live/stayconnected, and its English counterpart <http://www.xbox.com/en-US/live/stay-connected>, *Microsoft*, 2013, four pages.

Office Action dated May 24, 2017 issued in co-pending U.S. Appl. No. 14/524,263 (19 pgs.).

Office Action dated Nov. 22, 2017 issued in co-pending U.S. Appl. No. 14/524,263 (18 pgs.).

Office Action dated Feb. 15, 2018 issued in co-pending U.S. Appl. No. 14/524,263 (22 pgs.).

Office Action dated Sep. 10, 2018 issued in U.S. Appl. No. 14/524,263 (13 pgs.).

Office Action dated Oct. 11, 2018 issued in European Application No. 14 190 236.1 (7 pgs.).

Office Action dated Aug. 28, 2018 issued in Japanese Application No. 2014-025819 (2 pgs.).

Office Action dated Jan. 24, 2019 issued in U.S. Appl. No. 14/524,263 (15 pgs.).

\* cited by examiner

GAME SYSTEM WITH SHARED REPLAYS

CROSS REFERENCE TO RELATED APPLICATIONS

The disclosure of Japanese Patent Application No. 2014-25818, filed on Feb. 13, 2014, is incorporated herein by reference.

FIELD

The technique described herein relates to sharing information.

BACKGROUND AND SUMMARY

There is known in the art a game device for communicating with other users such as friends or family members online.

According to one aspect of the technique, there is provided an information sharing system, including: an executing unit that executes an application program according to operations of one of a plurality of users; a recording unit that records replay data for replicating an execution process of the application program; a generating unit that generates shared information associated with the application program based on operations of the one of the plurality of users; and a sharing unit that shares the generated shared information and the recorded replay data with the plurality of users.

DETAILED DESCRIPTION OF NON-LIMITING EXEMPLARY EMBODIMENTS

1. Exemplary Embodiment

Figure 1:
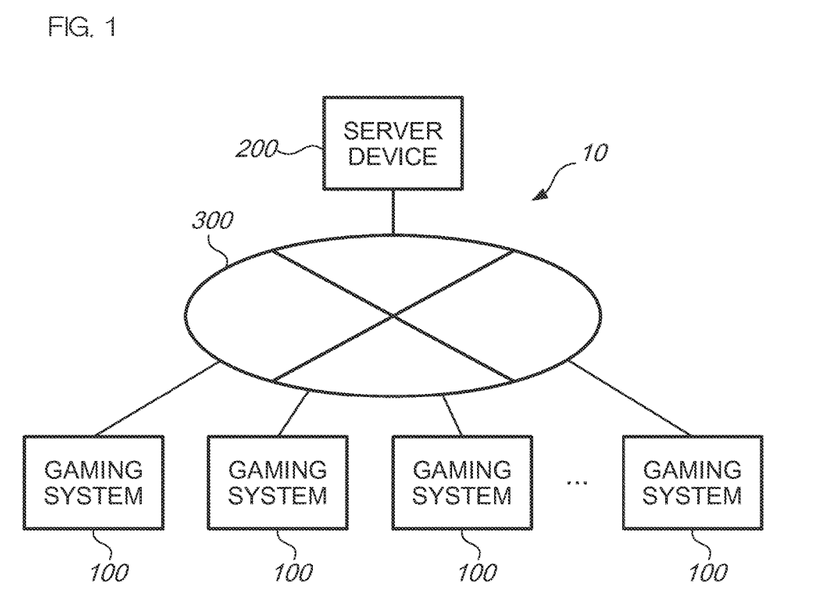
FIG. 1 shows an example of a configuration of an information sharing system.

FIG. 1 is a block diagram illustrating a configuration of information sharing system 10, which is an exemplary embodiment according to the present technique. Information sharing system 10 is a computer system for using an information sharing service. In the present technique, an information sharing service is a service for sharing information among plural users, such as a social networking service (SNS).

The plural users herein may be predetermined users (for example, registered users of the service), or unspecified users. Each user can create a relationship with a specific user in the service. Hereinafter, the user with whom the relationship is created will be referred to as "friend." Each user can request a user, for example, who is an acquaintance in a real life or who becomes acquainted through the service, to be a friend.

In the present exemplary embodiment, the information sharing service is a service for sharing information posted with regard to a certain game (video game). The main intention of the information sharing service is to facilitate communication with users who play a certain game. In the present exemplary embodiment, a genre of the game is not limited. However, the game herein is a game whose result varies according to operations of a user and which evaluates the user according to the result. Hereinafter, a program (application program) for providing a game for a user will be referred to as a "game program." The user can play the game while gaming system 100 executes the game program.

Information sharing system 10 includes plural gaming systems 100 and server device 200, which are connected to one another via network 300 such as the Internet. Server device 200 is a computer device that carries out main processing for providing the information sharing service to users. Gaming system 100 is an information-processing device (computer) for playing the game and accessing the information sharing service. Gaming system 100 corresponds to a client device of server device 200.

Figure 2:
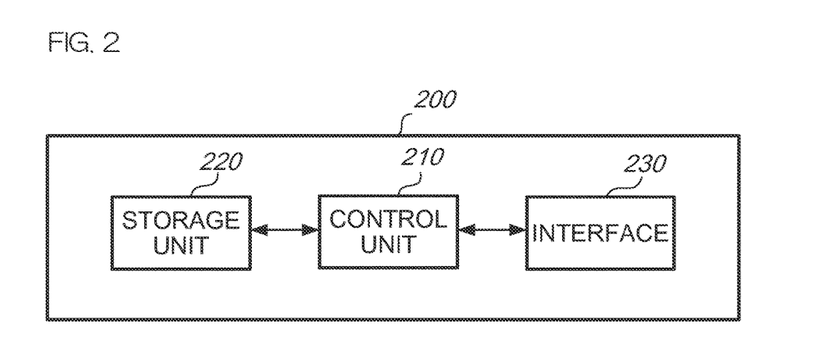
FIG. 2 shows an example of a hardware configuration of a server device.

FIG. 2 is a block diagram illustrating a hardware configuration of server device 200. Sever device 200 includes control unit 210, storage unit 220, and interface 230. Control unit 210 is a unit for controlling behavior of server device 200. Specifically, control unit 210 includes a processor such as a CPU (Central Processing Unit) and a main memory, and executes programs to control operations of components of server device 200. Storage unit 220 is a unit for storing data. Specifically, storage unit 220 includes a storage medium such as a hard disk, and stores shared information (described below) and other data. Interface 230 is a unit for exchanging data with gaming systems 100. Interface 230 exchanges data with each of gaming systems 100 by connecting to network 300.

It is to be noted that data using server device 200 may be stored in an external storage device, not in a memory included in server device 200 such as storage unit 220. In addition, functions of server device 200 can be realized by use of a single apparatus or by uses of multiple apparatuses (servers) co-operating with each other.

Figure 3:
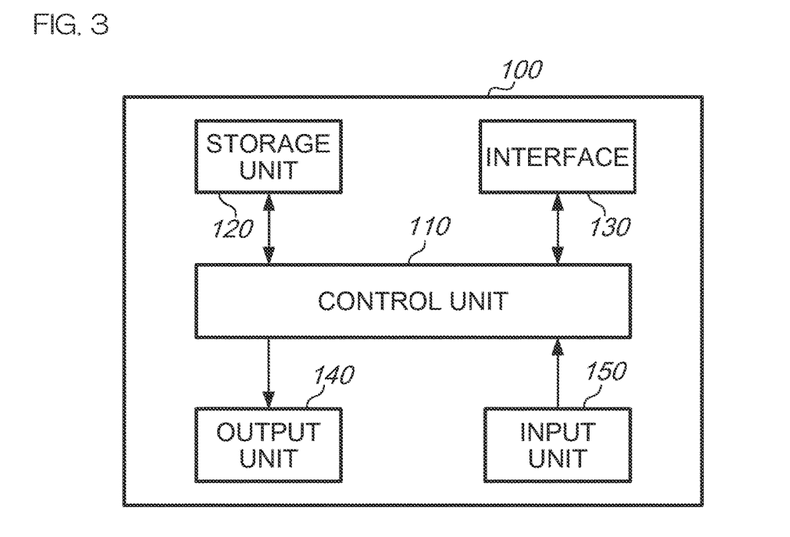
FIG. 3 shows an example of a hardware configuration of a gaming system.

FIG. 3 is a block diagram illustrating a hardware configuration of gaming system 100. In the present exemplary embodiment, gaming system 100 is a home-use game console. Gaming system 100 includes control unit 110, storage unit 120, interface 130, output unit 140, and input unit 150.

Control unit 110 is a unit for controlling operations of components of gaming system 100. Specifically, control unit 110 includes a processor such as a CPU and a main memory, and executes programs to control operations of the components. In addition, control unit 110 enables its user to play a game and access to the information sharing service.

Storage unit 120 is a unit for storing data. Specifically, storage unit 120 includes a storage medium such as a flash memory, and stores the programs including the above game program and data necessary for executing the programs. Storage unit 120 may include a data reader/writer attached to a detachable storage medium (removable medium) such as a memory card. The game program may be provided in the form of such a removable medium.

Interface 130 is a unit for exchanging data with server device 200. Interface 130 exchanges data by connecting to network 300 by modulating and demodulating data. Interface 130 may be configured to communicate with external devices other than server device 200.

Output unit 140 is a unit for outputting information. In the present exemplary embodiment, the term "output" includes display of image and playback of audio. Therefore, output unit 140 includes a unit for displaying an image, such as a liquid crystal display, and a unit for playing back audio, such as a speaker. Typically, output unit 140 is a television set. Output unit 140 may include an interface(s) for connecting to an external liquid crystal display and/or an external speaker.

Input unit 150 is a unit for receiving operations input by the user. For example, input unit 150 may include keys used for inputting characters or operations for playing the game. Input unit 150 may also include a sensor of a touch-screen display. In addition, input unit 150 may be configured to receive input using by well-known inputting methods such as speech recognition and gesture input.

It is to be noted that gaming system 100 can be realized by use of a single apparatus or by use of multiple apparatuses co-operating with each other. Hereinafter, gaming system 100 is composed of a main unit including control unit 110, storage unit 120, and interface 130, an input device corresponding to input unit 150 (for example, a remote controller), and a television set corresponding to output unit 140. The input device includes a touch-screen display, which accepts operations performed by use of a stylus pen or a user's finger. Therefore, gaming system 100 in the following description includes two display units.

The user can play the game by using gaming system 100. In addition, the user can access to the information sharing service and share information by using gaming system 100. Hereinafter, the information shared in the information sharing system will be referred to as "shared information." Gaming system 100 may work so that the user can browse shared information while playing the game. For example, gaming system 100 may display a game screen on one of the display units, and shared information on the other one of the display units.

Figure 4:
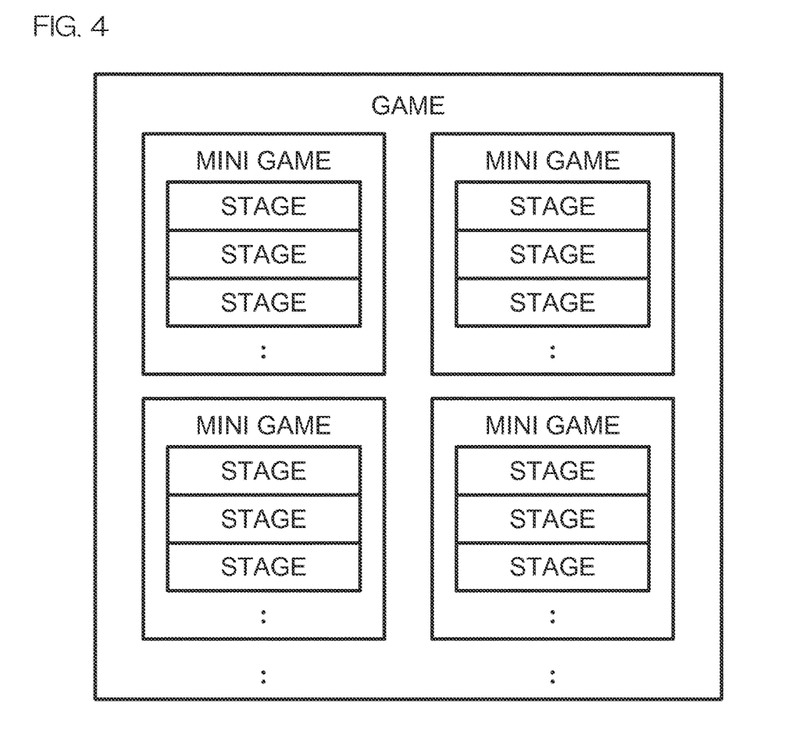
FIG. 4 shows an example of a game performed by a game program.

FIG. 4 shows an example of a game performed by the game program in the present exemplary embodiment. This game consists of plural mini games. Each of the mini games is divided into plural stages. The game program in the present exemplary embodiment has a function to execute each stage of the mini games. The user can play each stage of the mini games. Each of the mini games (or stages) is executed by subprograms that constitute a part of the game program. The number of the mini games and stages is not limited. The number of the stages of each mini game is not necessarily the same.

The mini games may be common or different genres. However, the mini games are common in the respect that the result of execution changes depending on operations of the user. The game program is programmed to determine a score according to a result of the mini game. The score is determined based on, for example, time required for a race, or points gained by defeating enemies or acquiring items.

The game in the exemplary embodiment is configured to evaluate a play status of each stage by displaying an index different from the score. The game program in the exemplary embodiment is programmed to evaluate the play status by awarding a number of stars (0 to 3). The number stars may be determined by the above score or the frequency of playing the stage. In the exemplary embodiment, 3 stars mean the best evaluation of each stage. Hereinafter, the score and the number of stars will be collectively referred to as "evaluation."

The game program may be programmed to perform a predetermined operation when the valuation fulfills a predetermined condition. For example, the game program may be programmed to enable the user to play a new mini game by obtaining a certain total number of stars. The game program may also be programmed to enable the user to use certain data available while creating shared information.

In the exemplary embodiment, a target (mission) is set at each stage. The target is, for example, to clear the mini game within a predetermined time, to gain a predetermined score in the mini game, or to obtain a specific item appearing in the mini game. The above score and number of stars may be increased as a result of accomplishing the target.

Figure 5:
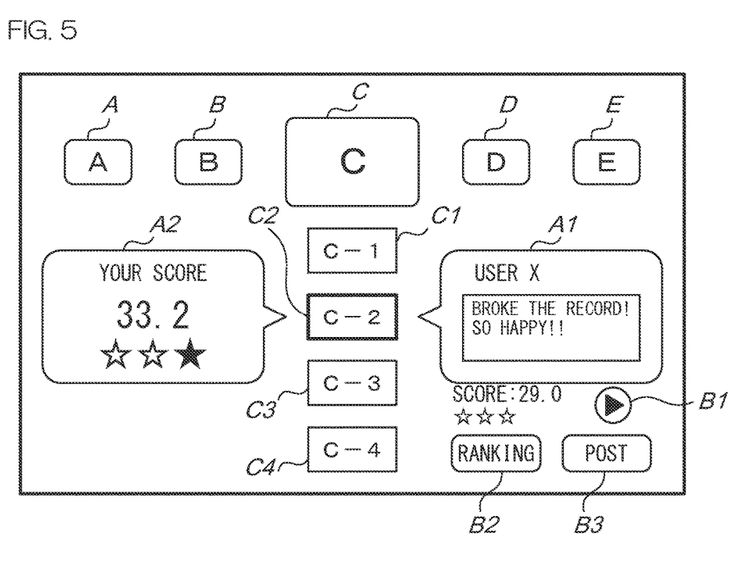
FIG. 5 shows an example of a display screen of shared information.

FIG. 5 shows an example of a display screen showing shared information. In the exemplary embodiment, shared information is displayed with respect to each stage of the mini game. In FIG. 5, icons A, B, C, D, and E are images indicative of mini games. The user (viewer) can select each of icons A to E by operations such as moving a cursor laterally.

Icons C1 to C4 are images indicative of stages. In this example, icon C1 indicates a first stage of mini game "C." The user can select each of icons C1 to C4 by operations such as moving the cursor vertically after selecting icon C. In FIG. 5, a second stage of mini game "C" is selected by the user.

Area A1 is a display area for displaying shared information. In this example, shared information typically includes texts input by a user who posted the shared information (poster). Shared information may include handwritten characters or illustrations input on the touch-screen display. The user (viewer) creates shared information, for example, when the user has cleared a stage or set a new record.

In area A1, an item of shared information is displayed, which is associated with a specific stage. In this example, the shared information is associated with the second stage of mini game "C," which is selected by the user. Gaming system 100 changes shared information displayed in area A1 at specified time intervals so that the user can browse various items of shared information associated with the second stage of mini game "C." Moreover, gaming system 100 displays a name (user name) of a user who posted the displayed shared information in area A1. Gaming system 100 may preferentially display shared information posted by the friend of the user (viewer).

Gaming system 100 displays the score, the number of stars, play button B1, ranking display button B2, and post button B3 adjacent to area A1. Play button B1 is a button for playing replay data, which is displayed when the replay data is associated with the displayed shared information. Play button B1 is not displayed when replay data is not associated with the displayed shared information, which will enable the user to check an existence of replay data easily. Ranking display button B2 is a button for displaying a score ranking of the stage corresponding to the displayed shared information. Post button B3 is a button for creating new shared information relating to the stage for which shared information is displayed.

On the other hand, gaming system 100 displays an achievement (evaluation) of its user (viewer) in area A2. The user can easily compare his/her achievement to other users' achievements by checking areas A1 and A2. Gaming system 100 may display a button similar to play button B1 adjacent to area A2. The button is a button for playing replay data that is associated with the displayed shared information.

Figure 6:
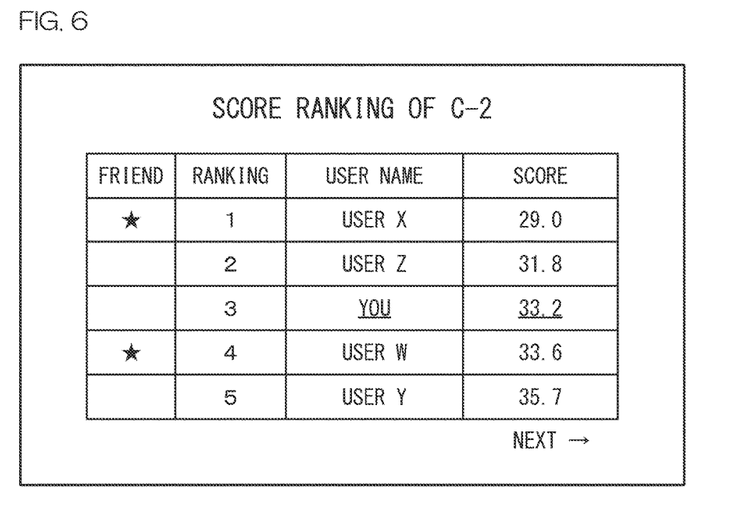
FIG. 6 shows an example of a display screen of a score ranking.

FIG. 6 shows an example of a screen displaying a ranking list. Gaming system 100 displays the ranking list when the user presses ranking display button B2. The ranking list is a list of users and scores relating to a specific stage (in this example, the second stage of mini game "C").

Gaming system 100 may display scores of all users who have played the specific stage once, or a predetermined number of the highest scores. When the viewer and a friend of the viewer are listed on the ranking list, gaming system 100 may display their scores in a different style (for example, color, font, or size of characters) from that used for other users.

Figure 7:
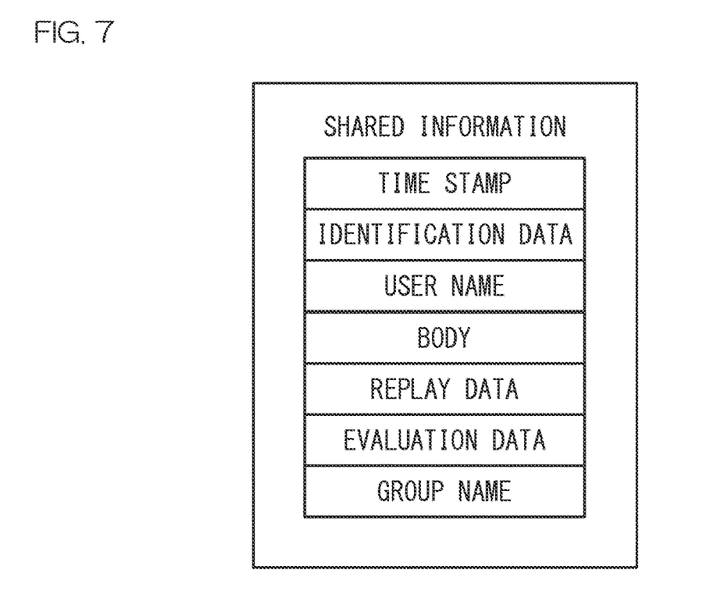
FIG. 7 shows an example of a data structure of the shared information.

FIG. 7 shows an example data structure of shared information. In this example, shared information is data including time stamp, identification data, user name, body, replay data, evaluation data, and group name. Shared information may not include some of these items, depending on circumstances. In addition, replay data and evaluation data are not necessarily a part of shared information, as long as they have a predetermined association with specific shared information.

Time stamp is data indicative of a temporal attribution of shared information. In this example, a time stamp indicates a date when the shared information is created.

Identification data is data for identifying a mini game and a stage associated with the shared information.

User name is data for identifying a user who created shared information. User name may be a nickname used in the information sharing service, or a real name.

Body is data indicative of a message input by the user. The message herein is text or handwritten characters or illustrations, as described above.

Replay data is data for replicating an execution process of the stage of the mini game identified by the identification data. Replay data indicates an execution process of the stage played by the user identified by the user name. Replay data may also indicate a history of operations of the user. In the exemplary embodiment, replay data indicates keys pressed by the user per unit time (for example, per frame of the game screen).

Evaluation data is data indicative of evaluation associated with the shared information. Specifically, evaluation data includes data indicative of the score (score data) and data indicative of the number of stars. Evaluation data may include blank data in respect to the score or the number of stars.

Group name is data indicative of a group of the stage identified by the identification data.

Figure 8:
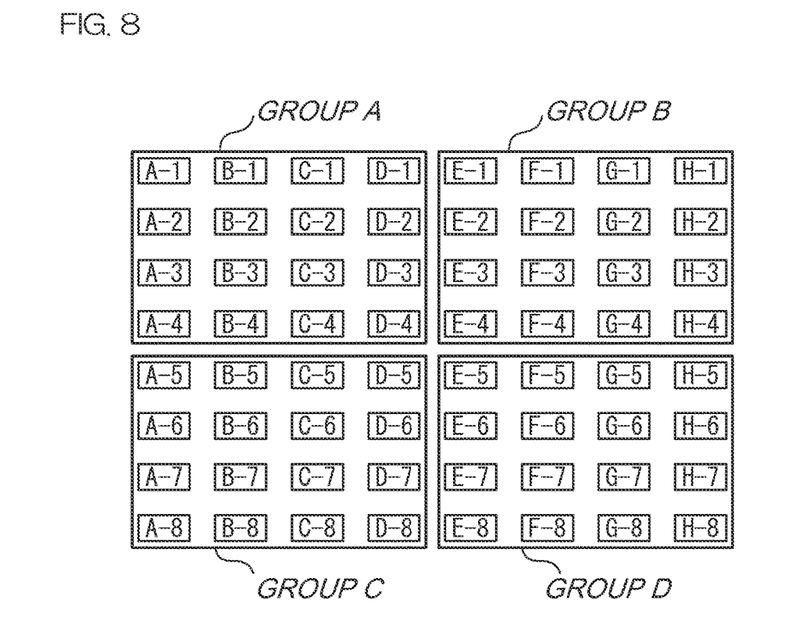
FIG. 8 shows an example of a grouping of stages.

FIG. 8 shows an example of grouping of stages. In the exemplary embodiment, stages are grouped into predetermined groups. Stages of the same group may be selected continuously in the display screen of shared information (see FIG. 5). For example, as shown in FIG. 5, when the user (viewer) is selecting the second stage of mini game "C," the user can select any one of a first to third stage of mini game "B," a first or third stage of mini game "C," and a first to third stage of mini game "D" by one movement of the cursor. In the example shown in FIG. 8, these stages are grouped into a common group.

Figure 9:
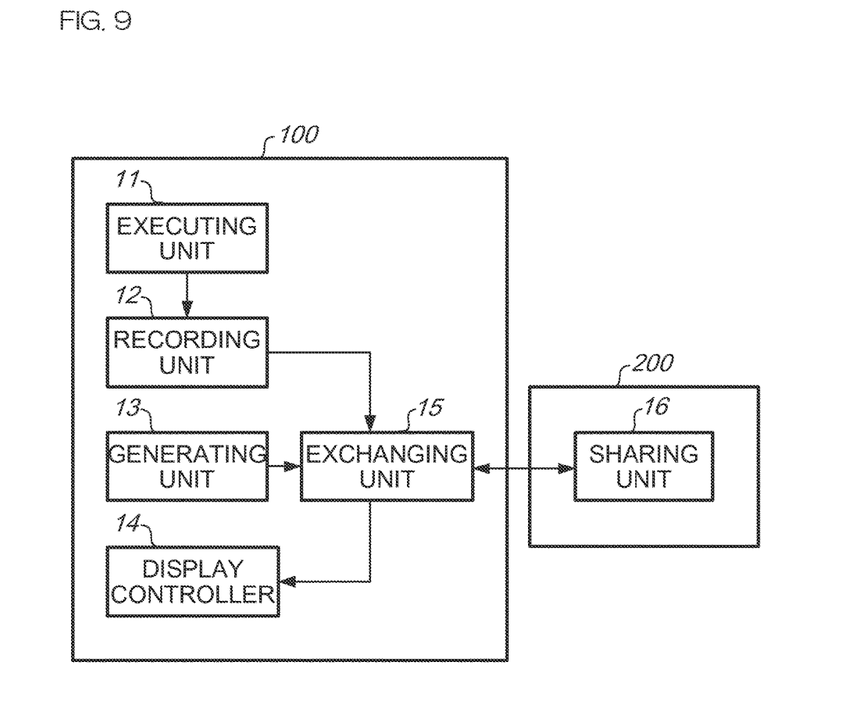
FIG. 9 shows an example of a functional configuration of the information sharing system.

FIG. 9 is a block diagram illustrating a functional configuration of information sharing system 10. Information sharing system 10 realizes executing unit 11, recording unit 12, generating unit 13, display controller 14, exchanging unit 15, and sharing unit 16 by co-operating with gaming system 100 and server device 200. Executing unit 11, recording unit 12, generating unit 13, display controller 14, and exchanging unit 15 is realized by control unit 110 of gaming system 100. On the other hand, sharing unit 16 is realized by control unit 210 of server device 200.

Executing unit 11 is a unit for executing the game program. Executing unit 11 enables a user to play each stage of the mini games. In addition, executing unit 11 determines the score and the number of stars based on a result of each stage. Executing unit 11 can count the score and the number of stars with respect to each stage of the mini games.

Recording unit 12 is a unit for recording replay data and evaluation data. Recording unit 12 records replay data and evaluation data when they are counted. For example, executing unit 11 counts these items of data when execution status of the game fulfills a predetermined condition. For example, executing unit 11 counts these items of data when the user has accomplished the target. However, executing unit 11 may count these data even though the user has not accomplished the target.

Generating unit 13 is a unit for generating shared information. Generating unit 13 generates shared information associated with any one of the stages of the mini games based on operations of the user. For example, when the user selects post button B3 (see FIG. 5), generating unit 13 displays an input screen of shared information, and receives operations input by the user. Alternatively, generating unit 13 may generate shared information when the execution status of the game fulfills a predetermined condition (such as accomplishing the target). Specifically, generating unit 13 may display the input screen and prompt to input a message when the execution status of the game fulfills the predetermined condition. At this time, the user does not necessarily input a message; the user may continue to play the mini game without inputting a message.

Display controller 14 is a unit for controlling display of information. Display controller 14 controls display of information such as shared information, the score, and the number of stars. Display controller 14 controls display of such information with respect to each stage. In addition, as described in FIG. 5, display controller 14 may control display of the score and the stars of the viewer and the poster. Moreover, display controller 14 controls display of Play button B1 by determining the existence of replay data.

Display controller 14 is configured to display the score ranking when a predetermined operation is performed by the user (for example, when ranking display button B2 is pressed). Display controller 14 may display a button similar to play button B1 with respect to each score, so that the user (viewer) can check play status of other users. Display controller 14 may also display a ranking by the number of stars.

Moreover, display controller 14 controls display of an execution process of the game by playing replay data. Display controller 14 plays replay data of a certain stage according to operations of the user. Display controller 14 can play replay data both received by exchanging unit 15 and recorded by recording unit 12.

Exchanging unit 15 is a unit for exchanging shared information. Specifically, exchanging unit 15 includes a transmitting unit and a receiving unit of shared information. When the user inputs a message associated with a certain stage and shared information is generated, exchanging unit 15 associates replay data and evaluation data with the generated shared information, and transmits the resulting data. If shared information has the data structure described in FIG. 7, exchanging unit 15 embeds replay data and evaluation data in shared information and transmits the resulting data to server device 200.

Exchanging unit 15 receives a plurality of shared information posted by plural users from server device 200. Firstly, exchanging unit 15 receives shared information associated with the stage selected by the user (in the example of FIG. 5, the second stage of mini game "C"). Secondly, exchanging unit 15 receives shared information associated with the stages other than the stage selected by the user, as necessary. At this time, exchanging unit 15 receives shared information associated with the stages whose group is the same as the stage selected by the user. Exchanging unit 15 receives shared information at specified time intervals such as once a minute. The time intervals of shared information associated with the stage selected by the user may be shorter than the time intervals of shared information associated with the stages whose group is the same as the stage selected by the user. Exchanging unit 15 may preferentially receive shared information posted by friends.

Sharing unit 16 is a unit for sharing shared information with users. Specifically, sharing unit 16 enables users to utilize shared information and handles sharing of shared information. Sharing unit 16 handles shared information with respect to each mini game and stage. To provide shared information to users, sharing unit 16 transmits shared information to gaming systems 100 according to a request from users.

Sharing unit 16 can provide shared information associated with the stage requested by the user and evaluation of users in the stage. Sharing unit 16 can provide evaluation of users in a comparable display form such as the ranking list described above. Sharing unit 16 may provide a ranking list with respect to each mini game, or a ranking list of comprehensive evaluation of mini games available in the game program.

Figure 10:
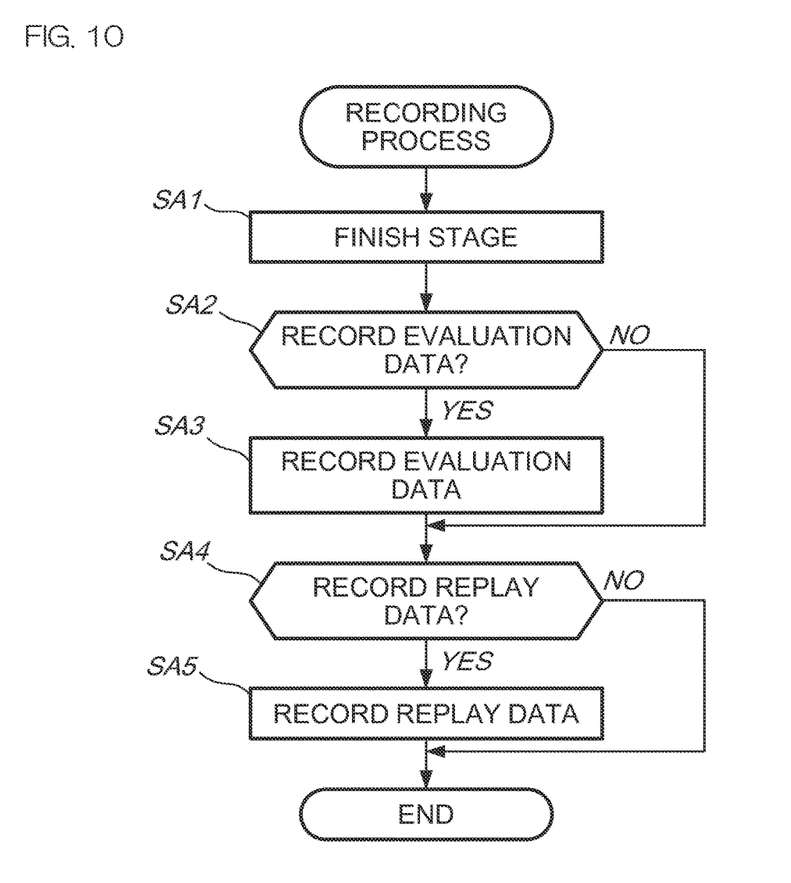
FIG. 10 shows an example of a flowchart illustrating a recording process of evaluation data and replay data.

FIG. 10 is a flowchart illustrating a recording process of data incidental to shared information. The data herein includes evaluation data and replay data. Control unit 110 executes the recording process each time the user has played any one of stages of the mini games.

First, control unit 110 finishes a certain stage according to operations of the user by executing the game program (step SA1). Control unit 110 finishes the stage when the execution status of the mini game fulfills a predetermined condition, such as when the user has accomplished the target of the stage, or the user has made a mistake.

Next, control unit 110 determines whether to record evaluation data (step SA2). For example, in a case where evaluation data is recorded only when the user has accomplished the target, control unit 110 determines whether the user has accomplished the target. Alternatively, in a case where the user can preliminarily configure the setting of whether evaluation data is included in shared information, control unit 110 determines the setting. Control unit 100 records evaluation data (step SA3) or skips step SA3 according to the determination in step SA2. Control unit 110 distinguishes the stage finished in step SA1 and records evaluation data of the stage in a predetermined storage area of storage unit 120. Control unit 110 records evaluation data in association with the corresponding stage.

As for replay data, control unit 110 executes the similar processing as evaluation data. Specifically, control unit 110 determines whether to record replay data (step SA4) and records evaluation data (step SA5) or skips step SA5 according to the determination in step SA4. Control unit 110 may determine not to record replay data if the data size of the replay data exceeds a predetermined limit. Alternatively, if the data size of replay data exceeds the limit, control unit 110 may record a part of the replay data not exceeding the limit and discard a surplus of the replay data. Control unit 110 records replay data in association with the corresponding stage in common with evaluation data.

It is to be noted that storage unit 120 stores the latest evaluation data and replay data with respect to each stage. Therefore, when a user has played a certain stage more than once, this data is overwritten with the latest data.

Figure 11:
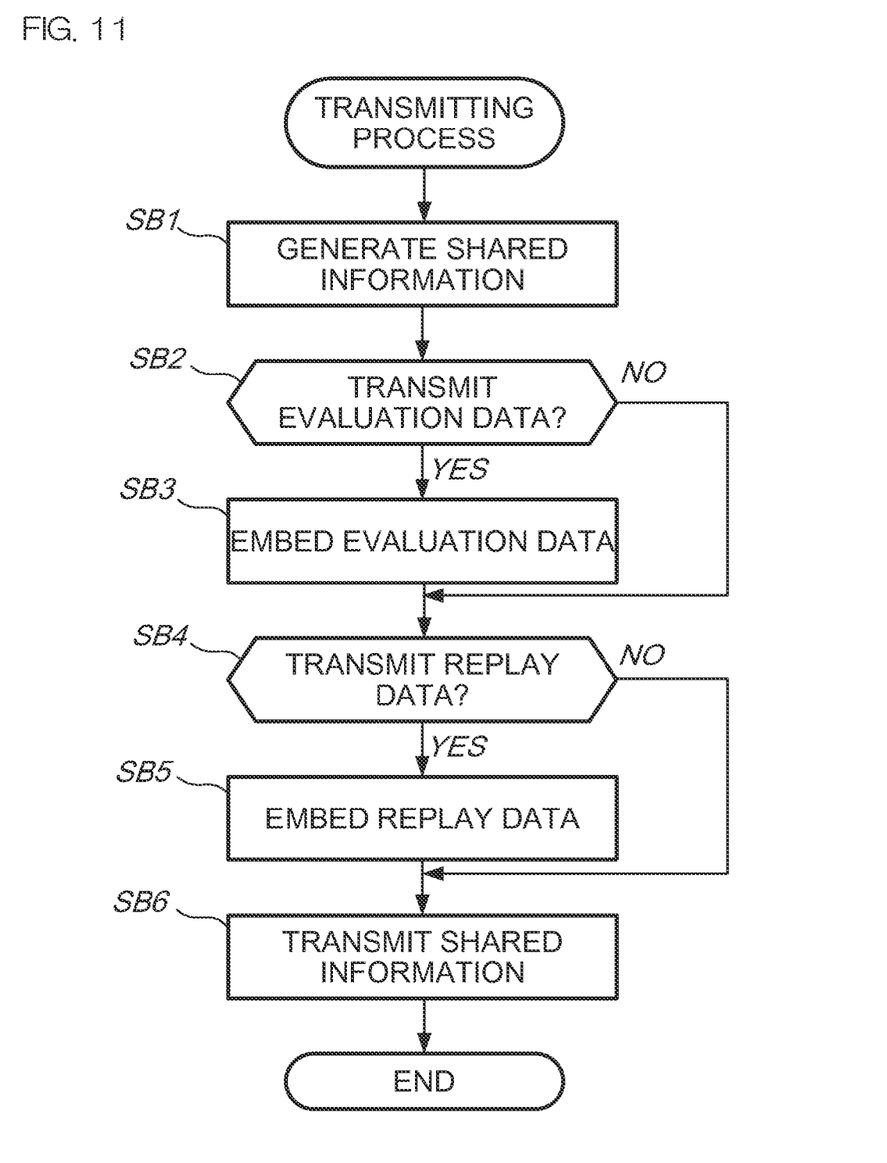
FIG. 11 shows an example of a flowchart illustrating a transmitting process of the shared information.

FIG. 11 is a flowchart illustrating a transmitting process of shared information. Control unit 110 executes the transmitting process when transmitting shared information associated with the specific stage. At the beginning of the transmitting process, control unit 110 generates shared information according to operations of the user (step SB1). The user performs an operation for transmitting shared information after inputting a body of the shared information. After receiving the operation, control unit 110 generates the shared information in preparation for transmission. Shared information at this time does not include evaluation data and replay data.

Subsequently, control unit 110 determines whether to send evaluation data associated with the generated shared information (step SB2). In this step, control unit 110 determines whether the evaluation data is stored on the predetermined storage area described above. Control unit 110 also determines the existence of the setting configured by the user. Control unit 110 embeds the evaluation data in the generated shared information when determining to send the evaluation data (step SB3).

As for replay data, control unit 110 executes the similar processing as evaluation data. Specifically, control unit 110 determines whether to send replay data associated with the generated shared information by determining whether the replay data is stored in the predetermined storage area (step SB4) and embeds the replay data in the generated shared information according to the determination in step SB4 (step SB5). Control unit 110 may omit replay data from shared information with respect to a specific stage.

After steps SB2 to Sb5, control unit 110 transmits the shared information (step SB6). Shared information at this time includes evaluation data and replay data according to determinations made in steps SB2 and SB4.

By executing processes shown in FIGS. 10 and 11, gaming system 100 can transmit the latest evaluation data and replay data associated with a stage together with shared information with respect to the stage without performing a specific operation such as attaching a file. Therefore, there is no necessity for the user to choose appropriate items out of a plurality of evaluation data items to replay data when posting shared information.

In addition, according to the present exemplary embodiment, transmitting and displaying of shared information and evaluation data and/or replay data can be realized by use of a single apparatus (gaming system 100). Therefore, it enables the user to perform operations for transmitting and displaying more easily than by use of multiple apparatuses.

Moreover, according to the present exemplary embodiment, the user (viewer) can browse shared information posted by the other user (poster) together with evaluation data and replay data associated with the shared information. When the poster posts his/her impression at a notable moment (such as setting a new record) as a message, s/he can post evaluation data and/or replay data together with the message, which may enable the viewer to congratulate the poster or to encourage competition with the poster. Additionally, the user can easily compare other users' evaluations with their own evaluation.

2. Modifications

The above exemplary embodiment is an example of an embodiment of the present technique. The present technique may be implemented in embodiments shown by the following modifications, other than the above exemplary embodiment. The following modifications may be combined with each other.

(Modification 1)

Gaming system 100 may generate shared information including a predetermined text (for example, "I've accomplished the target." or "I've set a new record!") when the execution status of the game fulfills a predetermined condition, which will enable the user to post shared information automatically without inputting a message at that time. The text may be input by the user in advance, or may be predetermined and available to all users. In addition, the user can also submit evaluation data and replay data without performing a specific operation for submission.

(Modification 2)

As described above, the association with shared information suffices for evaluation data and replay data. Therefore, it is not necessary for gaming system 100 to transmit evaluation data, replay data, and shared information at the same time. Server device 200 can determine the association with evaluation data, replay data, and shared information if these data are assigned identification data. In this case, evaluation data, replay data, and shared information may include a time stamp.

(Modification 3)

The ranking list may be generated by gaming system 100 or server device 200. For example, server device 100 may perform ranking of users and gaming system 100 may display the name and evaluation of the users according to the ranking. Alternatively, server device 200 may transmit evaluation data without performing ranking and gaming system 100 may perform ranking of users based on the transmitted evaluation data.

(Modification 4)

The groups of the stages (see FIG. 8) are not necessarily predetermined. For example, gaming system 100 may identify the stage selected by the user and determine a group based on the identified stage. The determined group consists of the identified stage and plural stages that the user can select within a certain time from movement of the cursor. Gaming system 100 determines a group each time the selected stage is changed.

(Modification 5)

Gaming system 100 may record plural evaluation data and replay data with respect to each stage. In other words, it is not necessary for gaming system 100 to overwrite evaluation data and replay data. In this case, gaming system 100 may transmit the best evaluation data and replay data in association with shared information.

(Modification 6)

The data structure of replay data is not limited. For example, if the game is played by the user by moving the position of a display object (such as a main character of the game), replay data may indicate a history of positions of the display object. Alternatively, replay data may be a video file of a certain format such as H.264.

Replay data may be executable data of the game. For example, when the user performs a specific operation while playing replay data, gaming system 100 may suspend playing the replay data and then proceed to execute the game according to operations input by the user. The user can use replay data posted by another user as a reference, or to learn a trick for playing the game better. In this case, replay data is preferably a history of positions of the display object, rather than a video file.

The game program does not necessarily include plural mini games. The present technique can be applied to a gaming system executing plural game programs.

The present technique can be applied to application programs other than the game program. The game program is an example of the application programs according to the present technique. The present technique may provide a system for sharing evaluation data and/or replay data with respect to an application program having plural different functions.

The present technique can be applied to a portable gaming device, not only to a home-use game console. In addition, the present technique can be applied to a general information-processing device such as a personal computer or a smartphone. Functions of gaming system 100 may be realized by co-operation of plural processors. A part of configuration of gaming system 100 may be realized by server device 200.

The present technique can provide not only an information-processing device corresponding to gaming system 100, but also an information sharing system, an information sharing method, and others. Moreover, the present technique can provide a program to realize the function of gaming system 100. The program may be provided to an information-storage device in the form of a storage medium such as an optical disk or a semiconductor memory. Alternatively, the program may be downloaded to an information-processing device via a network such as the Internet.

What is claimed is:

1. An information sharing system, comprising:
an executing unit configured to execute an application program according to operations of one of a plurality of users, the application program enabling a user to play a game;
a recording unit configured to record first replay data for replicating an execution process of the application program;
a generating unit configured to generate first shared information based on operations of the one of the plurality of users;
a sharing unit configured to share the first shared information and the first replay data with the plurality of users;
a receiving unit configured to receive second shared information related to a stage appearing in the game, and receive second replay data associated with the second shared information; and
a display controller configured to:
simultaneously display a plurality of selectable game icons along with an icon indicative of the stage appearing in the game, wherein the icon indicative of the stage appearing in the game corresponds to a selected one of the plurality of selectable game icons; and
upon detecting selection of the icon indicative of the stage, simultaneously display, together with the icon indicative of the stage, the second shared information related to the stage indicated by the selected icon, and a play button that when selected, initiates display of the second replay data associated with the second shared information;
wherein the play button is not displayed when replay data is not associated with the displayed second shared information.

2. The information sharing system according to claim 1, wherein the sharing unit provides the latest first replay data at the time the first shared information is generated, together with the first shared information.

3. The information sharing system according to claim 1, wherein the display controller configured to control display of the first and second shared information generated by operations of the plurality of users and the execution process of the application program by using the one of the first and second replay data associated with one of the first and second shared information selected by the user.

4. The information sharing system according to claim 1, wherein:
the executing unit executes a plurality of application programs performing different functions or an application program performing a plurality of different functions;
the recording unit records a plurality of items of first replay data with respect to each of the functions; and
the sharing unit handles the first shared information and the first replay data with respect to each of the functions.

5. The information sharing system according to claim 4, wherein:
the display controller is configured to control display of the first shared information with respect to each of the functions; and
the receiving unit is configured to receive, when the first shared information with respect to one of the functions is displayed, the first shared information with respect to any one of the other functions.

6. The information sharing system according to claim 4, wherein the generating unit generates the first shared information including identification data of the function.

7. The information sharing system according to claim 1, wherein:
the recording unit records evaluation data indicative of an evaluation determined by a result of execution by the executing unit; and
the sharing unit handles the evaluation data associated with the first shared information and the first replay data.

8. The information sharing system according to claim 7, wherein the display controller is configured to control, in a case where first shared information is displayed by the display controller, display of the evaluation indicated by the evaluation data associated with the first shared information.

9. The information sharing system according to claim 1, wherein the first replay data indicates a history of the operations.

10. The information sharing system according to claim 1, wherein:
the application program performs a process for moving a display object according to operations of the one of the plurality of users; and
the first replay data indicates a history of positions of the display object.

11. The information sharing system according to claim 1, wherein the application program is a game program.

12. An information-processing device, comprising:
one or more computer processors at least configured to:
execute an application program according to operations of one of a plurality of users, the application program enabling a user to play a game;
record first replay data for replicating an execution process of the application program;
generate first shared information based on operations of the one of the plurality of users;
transmit the first shared information and the first replay data in association with each other;
receive second shared information related to a stage appearing in the game, and receive second replay data associated with the second shared information;
simultaneously display a plurality of selectable game icons along with an icon indicative of the stage appearing in the game, wherein the icon indicative of the stage appearing in the game corresponds to a selected one of the plurality of selectable game icons; and
upon detecting selection of the icon indicative of the stage, simultaneously display, together with the icon indicative of the stage, the second shared information related to the stage indicated by the selected icon, and a play button that when selected, initiates display of the second replay data associated with the second shared information;
wherein the play button is not displayed when replay data is not associated with the displayed second shared information.

13. The information-processing device according to claim 12, wherein the one or more processors is further configured to replicate the execution process related to the one of the plurality of users by using the first replay data and the execution process related to the other user by using the second replay data.

14. The information-processing device according to claim 12, wherein one or more processors is further configured to:
record first evaluation data indicative of evaluation determined by a result of execution in association with the first replay data;
transmit the first evaluation data together with the first shared information and the first replay data;
receive second evaluation data together with the second shared information and the second replay data; and
control display of the evaluation by using the first and second evaluation data.

15. A non-transitory storage medium storing a program causing a computer device to execute a process, the process comprising:
executing an application program according to operations of one of a plurality of users, the application program enabling a user to play a game;
recording first replay data for replicating an execution process of the application program;
generating first shared information based on operations of the one of the plurality of users;
transmitting the first shared information and the first replay in association with each other;
receiving second shared information related to a stage appearing in the game, and receiving second replay data associated with the first shared information;
simultaneously displaying a plurality of selectable game icons along with an icon indicative of the stage appearing in the game, wherein the icon indicative of the stage appearing in the game corresponds to a selected one of the plurality of selectable game icons; and
upon detecting selection of the icon indicative of the stage, simultaneously displaying, together with the icon indicative of the stage, the second shared information related to the stage indicated by the selected icon, and a play button that when selected, initiates display of the second replay data associated with the second shared information;

wherein the play button is not displayed when replay data is not associated with the displayed second shared information.

16. An information sharing method, comprising:

executing an application program according to operations of one of a plurality of users, the application program enabling a user to play a game;

recording first replay data for replicating an execution process of the application program;

generating first shared information based on operations of the one of the plurality of users;

transmitting the first shared information and the first replay data in association with each other;

receiving second shared information related to a stage appearing in the game, and receiving second replay data associated with the first shared information;

simultaneously displaying a plurality of selectable game icons along with an icon indicative of the stage appearing in the game, wherein the icon indicative of the stage appearing in the game corresponds to a selected one of the plurality of selectable game icons; and upon detecting selection of the icon indicative of the stage, simultaneously displaying, together with the icon indicative of the stage, the second shared information related to the stage indicated by the selected icon, and a play button that when selected, initiates display of the second replay data associated with the second shared information;

wherein the play button is not displayed when replay data is not associated with the displayed second shared information.

\* \* \* \* \*